(12) United States Patent
Muradyan et al.

(10) Patent No.: US 7,903,853 B2
(45) Date of Patent: Mar. 8, 2011

(54) AUTOMATED METHODS FOR PRE-SELECTION OF VOXELS AND IMPLEMENTATION OF PHARMACOKINETIC AND PARAMETRIC ANALYSIS FOR DYNAMIC CONTRAST ENHANCED MRI AND CT

(75) Inventors: Naira Muradyan, White Plains, NY (US); Andreas Muehler, Mountain Lakes, NJ (US)

(73) Assignee: iCAD, Inc., Beavercreek, OH (US)

( * ) Notice: Subject to any disclaimer, the term of this patent is extended or adjusted under 35 U.S.C. 154(b) by 1024 days.

(21) Appl. No.: 11/582,709

(22) Filed: Oct. 18, 2006

(65) Prior Publication Data

US 2007/0165927 A1    Jul. 19, 2007

Related U.S. Application Data

(60) Provisional application No. 60/727,658, filed on Oct. 18, 2005, provisional application No. 60/729,657, filed on Oct. 24, 2005.

(51) Int. Cl.
*G06K 9/00* (2006.01)
(52) U.S. Cl. ......... 382/128; 382/130; 382/131; 382/132; 382/172; 600/410; 600/420
(58) Field of Classification Search .......... 382/128–132, 382/168, 172
See application file for complete search history.

(56) References Cited

U.S. PATENT DOCUMENTS

| | | | |
|---|---|---|---|
| 5,638,458 A * | 6/1997 | Giger et al. ................ | 382/132 |
| 6,310,477 B1 * | 10/2001 | Schneider .................. | 324/307 |
| 6,317,617 B1 | 11/2001 | Gilhuijs et al. | |
| 6,584,216 B1 | 6/2003 | Nyul et al. | |
| 7,245,748 B2 * | 7/2007 | Degani et al. ............... | 382/128 |
| 7,260,249 B2 * | 8/2007 | Smith ......................... | 382/128 |
| 2003/0095714 A1 | 5/2003 | Avinash | |
| 2003/0223627 A1 * | 12/2003 | Yoshida et al. ............. | 382/128 |
| 2005/0038619 A1 * | 2/2005 | Degani ........................ | 702/100 |
| 2005/0074149 A1 * | 4/2005 | Niemeyer .................... | 382/128 |
| 2005/0207631 A1 * | 9/2005 | Martens et al. ............. | 382/131 |

OTHER PUBLICATIONS

Hiroyuki Yoshida, Yoshitaka Masutani, Peter MacEneaney, David T. Rubin and Abraham H. Dachman, "Computerized Detection of Colonic Polyps at CT Colongraphy on the Basis of Volumetric Features: Pilot Study" Radiology, Feb. 2002, Issue 222, pp. 327-336.*
Clark M.C., "Knowledge-Guided Processing of Magnetic Resonance Images of the Brain", A dissertation submitted to the College of Engineering of the University of South Florida, [online] May 1998 [retrieved on Mar. 17, 2007], Retrieved from: ,URL:http://etd.fcla.edu/SF/SFE0000001/etd.pdf., pp. 95-98.

* cited by examiner

*Primary Examiner* — Brian Q Le
*Assistant Examiner* — Eric Rush
(74) *Attorney, Agent, or Firm* — Foley Hoag LLP

(57) ABSTRACT

A method, system and computer-readable medium of filtering noise pixels and other extraneous data, including saturated fat tissue and air data in image data is provided. Examples of image data may include but are not limited to magnetic resonance imaging data and computed tomography data. The method includes receiving pixel count for each signal intensity value of the image data; determining a signal intensity value, $I_{peak}$, corresponding to a pixel count of a greatest number of pixels, $N_{peak}$; setting a noise threshold at a signal intensity value, $I_{noise}$, corresponding to a pixel count, $N_I$, such that $N_I$ is determined based on $N_{peak}$; and filtering from the image data one or more pixels with signal intensity values below the noise threshold. $N_I$ may be determined such that $N_I = N_{peak}/3$ or close to $N_{peak}/3$.

54 Claims, 13 Drawing Sheets

Fig. 1A
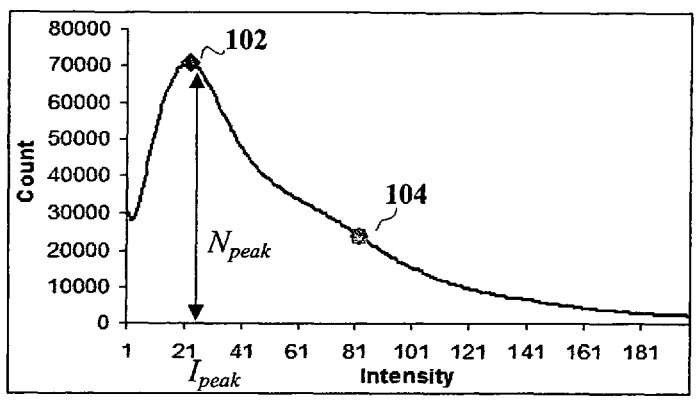
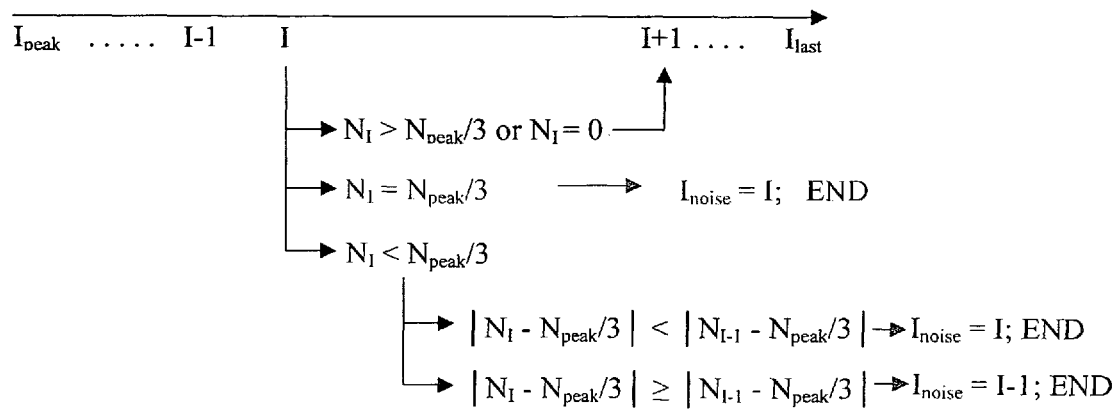
Fig. 1B

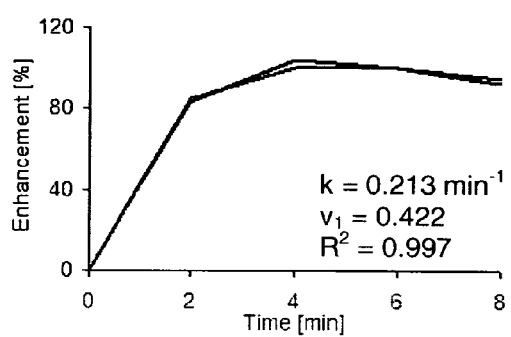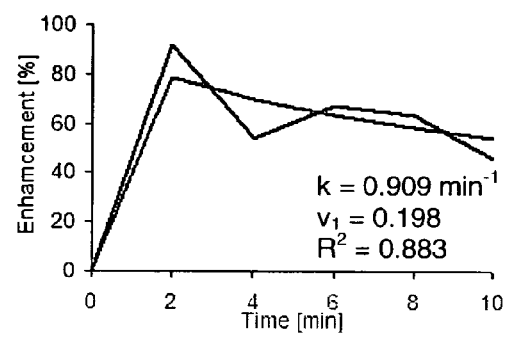
Fig. 5A                          Fig.5B

Fig. 7A
Fig. 7B
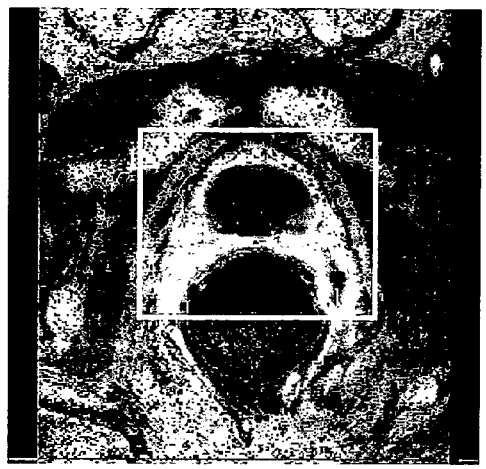

Fig.10A
Fig.10B
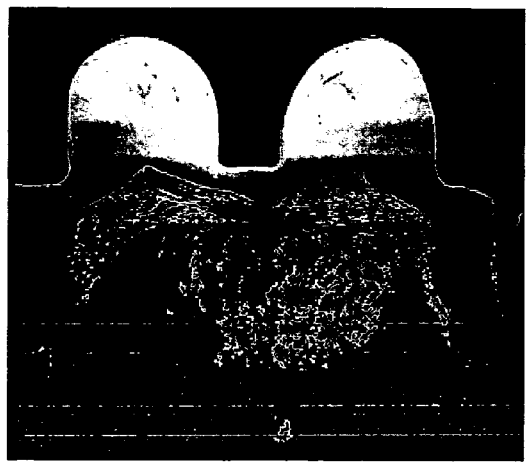 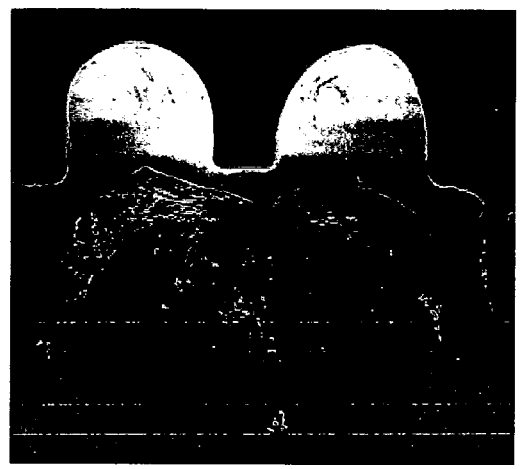

Fig.11A
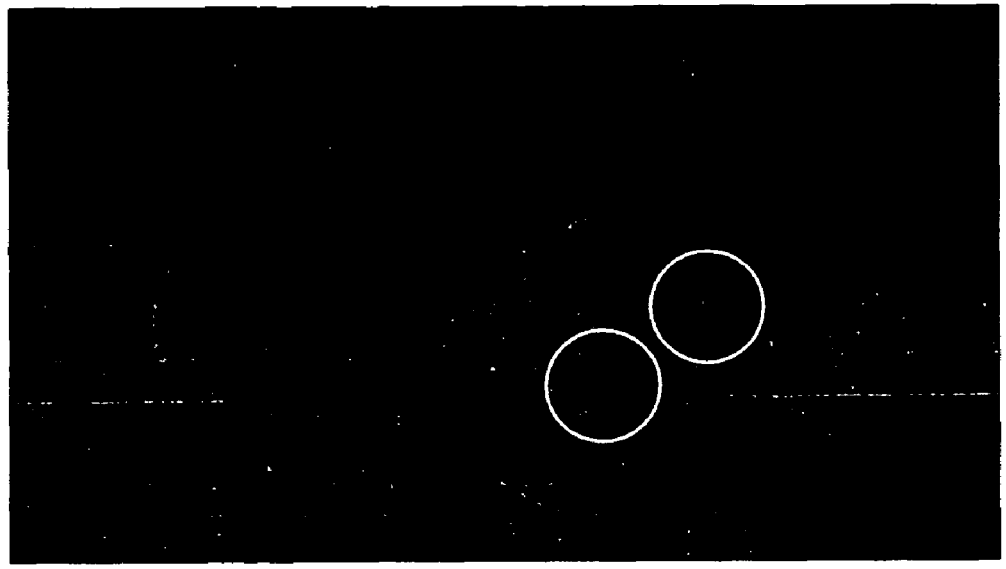
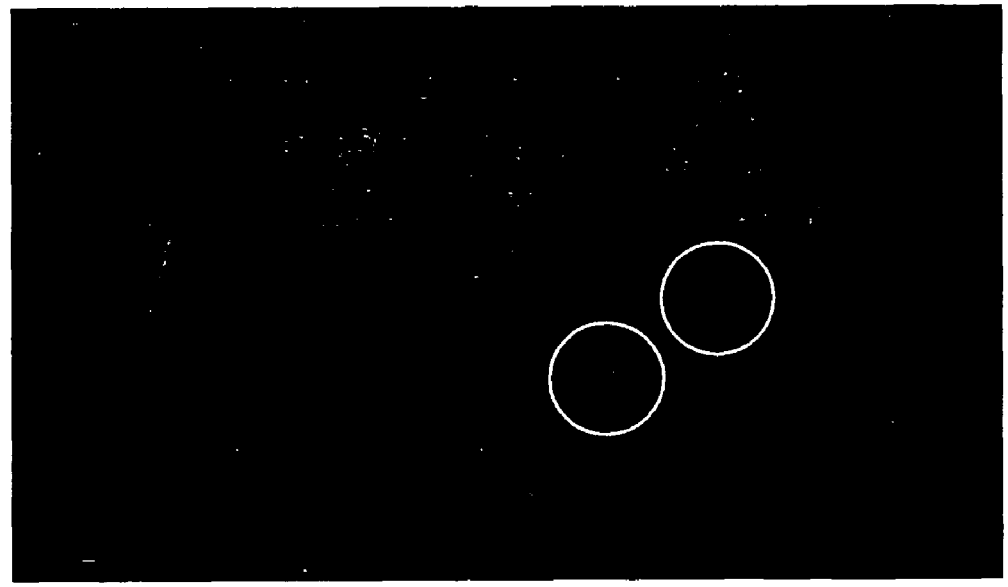
Fig.11B

AUTOMATED METHODS FOR PRE-SELECTION OF VOXELS AND IMPLEMENTATION OF PHARMACOKINETIC AND PARAMETRIC ANALYSIS FOR DYNAMIC CONTRAST ENHANCED MRI AND CT

CROSS-REFERENCE TO RELATED APPLICATIONS

This application claims the benefit of U.S. Provisional Patent Application No. 60/727,658 filed on Oct. 18, 2005 and U.S. Provisional Patent Application No. 60/729,657 filed on Oct. 24, 2005.

FIELD OF THE INVENTION

The present application relates to medical imaging devices generally, and to methods, systems, and programs of instructions for the evaluation of potentially malignant tissue based on image data such as magnetic resonance imaging (MRI), computed tomography (CT) or other such imaging procedures and devices.

BACKGROUND OF THE INVENTION

Early detection of disease and malignant tissue can lead to a better prognosis. The development of non-invasive methods for detection and characterization of tumors has an extreme importance in current medicine. Since breast cancer is one of the most common causes of cancer-related death in women and prostate cancer in men, it would be important to develop better possibilities for early detection and lesion characterization. The appropriate and accurate tumor localization/characterization and staging are very important for best choice of treatment. The most common diagnostic/screening methods for breast or prostate cancer are mammogram for breast, ultrasound and conventional magnetic resonance imaging (MRI). These methods are not always able to localize and/or characterize the cancerous and healthy tissues.

The progression and metastasis of cancer depend on the capacity of the tumor cells to interact with their microenvironment and induce angiogenesis. This induction is mediated by a large number of angiogenic factors, which collectively lead to capillary bed proliferation, increased vascularity and sprout extension into the tumor, as well as migration of the tumor cells toward the vessels. Dynamic contrast enhanced magnetic resonance imaging (DCE-MRI) and CT provide an effective means of monitoring non-invasively and with high spatial resolution the microvascular properties of tumors. The increased permeability of tumor vasculature gives rise to increased leakage of tracers including MRI/CT contrast agents, and enables characterization of enhancement patterns in the tissue. The enhancement patterns can be analyzed by mathematical models that relate the dynamic changes in the signal intensity to physiologic parameters such as the influx and efflux transcapillary transfer constants, which are also related to the surface area and permeability of the microvasculature.

MRI and CT differentiate between solid and vascular structures, even without contrast material. MRI uses relatively harmless radio waves and there is no exposure to ionizing radiation. Due to longer acquisition time, patient movement is more detrimental.

A comparatively new method for characterization of tumor microvasculature is the dynamic contrast enhanced (DCE) MRI. For DCE-MRI or CT the multi-slice images are acquired before and during the contrast agent infusion.

In usual practice the signal intensity versus time curves are evaluated and classified according to their shape (mostly subjectively by eye). There were also developed a few other methods that create parametric maps based on signal intensities of selective time instances, or simplistic curve shape estimations to assist radiologist in case evaluations.

But there are also some complex pharmacokinetic models that were originally developed to describe the blood-brain barrier permeability, later they were modified to apply to breast lesions, and other body parts/organs. Pharmacokinetic models use the signal intensity versus time curves for quantitative assessment of permeability and microvasculature of tissues. These characteristics vary from normal to malignant tissues, thus making the ability to estimate them very valuable for comprehensive analysis and more accurate evaluation of MRI/CT exams. And being non-invasive, DCE-MRI/CT is very helpful not only for initial and early diagnosis, but also as a painless follow-up for treatments.

During pharmacokinetic analysis of MRI data, all applicable parameters and settings of MRI exam are used to fit the signal intensity curves to appropriate complex mathematical models for estimation of tissue parameters. Some examples of those models may include, but are not limited to, Brix' model, Larsson's model, Tofts' model and their modifications. For example, the Tofts' model calculates vascular permeability (k) and extracellular volume fraction ($v_1$) of tumors. There are some specific sequences, commonly used in DCE-MRI: Gradient-Echo, Spin-Echo, Fast Low Angle Shot (FLASH). For example, for Gradient Echo sequence the ideal time curve (Enhancement curve) of each voxel is described by the following equation:

$$E(t) = \frac{I(t) - I(0)}{I(0)} \qquad (1)$$

$$= e^{-TER_2 C_t} \frac{[1 - e^{-TR/T_{10}}\cos\theta][1 - e^{-TR(T_{10}^{-1}+R_1 C_t(t))}]}{[1 - e^{-TR/T_{10}}][1 - e^{-TR(T_{10}^{-1}+R_1 C_t(t))}\cos\theta]} - 1,$$

where I(t) is the signal intensity of the voxel at time t after contrast agent injection, E(t) is the enhancement and $C_t(t)$ is the contrast agent (CA) concentration, defined as follows for Tofts' model:

$$C_t(t) = Dk \sum_{i=1}^{2} a_i (e^{-k/v_1} - e^{-m_i t})/(m_i - k/v_1). \qquad (2)$$

All the parameters in these equations except k and $v_1$ are defined by scan sequence parameters and other predefined or measured blood parameters: TE is the echo time; TR is the repetition time; R1 and R2 are relaxivities; $T_{10}$ is the inherent tissue relaxation rate, that can be measured using the same sequence (as for DCE-MRI) before the contrast agent injection with different TR or flip angle θ; $a_{1,2}$ and $m_{1,2}$ are the blood plasma parameters that can be measured using the dynamic curve of a major vein or artery. Thus there are only two unknown tissue parameters permeability (k) and extracellular volume fraction ($v_1$) that will be changed trying to find the best fit of the voxels CA concentration curve to the ideal formula above Eq. (2). For example, the Levenberg-Marquardt algorithm may be used for fitting. The quality of fit is controlled by the $R^2$ parameter that compares the actual curve with the fitted one. If they are exactly the same $R^2=1$, otherwise the smaller the $R^2$, the worse is the fit. By default the fit results are accepted only if $R^2 \geqq 0.75$ or 0.70 for higher than 50 sec/phase temporal resolution. But the user can also specify the desirable $R^2$, if necessary. For example, each voxel is tried to fit 5 times with random initial guesses for k and $v_1$.

For dynamic contrast enhanced CT the ideal time curve (Enhancement curve) of each voxel is described by the following equation:

$$E(t) = \frac{I(t) - I(0)}{I(0)} = \frac{q}{p} C_t(t). \qquad (3)$$

Where $C_t(t)$ is the contrast agent (CA) concentration, defined above Eq.(2) for Tofts' model. The pharmacokinetic analysis of $C_t(t)$ is similar to the one for MRI, described above.

One of the main requirements of MRI and CT is "oversampling", i.e. the scanned volume is usually big enough not only to enclose the organ/region of interest but also surrounding tissues. Therefore the scanned volume is usually much bigger than the region or tissue of interest (ROI). The full pharmacokinetic analysis is applied to the all existing voxels of the dynamic, contrast-enhanced series (e.g., many million voxels for a breast MRI). Thus, the full pharmacokinetic analysis may take too much time to be performed in clinical routine on every patient. In current fast workflow of medical imaging, practitioners such as radiologists are expected to get all the information processed and proceed to interpretation/diagnosis quickly. In such environments, it is impractical for a user to manually select a region or tissue of interest, and limit a full pharmacokinetic analysis to such area. However, currently there are no algorithms that would automatically select only those voxels that are of interest for a full pharmacokinetic analysis. For such reasons, all the important information and/or results that the full pharmacokinetic analysis can provide was available only to researchers, who would manually select the appropriate small region of interest (either a small region in the image or often just 1 particular slice), and who had no time restraints on how long such full pharmacokinetic analysis may take.

Thus applying the model to all voxels in the study incurs long processing times and delays. On the other hand, manually placing ROI and thresholds are subjective and cause important spots from first glance drawn ROI to be missed. In addition, manually choosing thresholds are often prone to errors resulting in incorrect thresholds. If a chosen threshold is too high, one may miss the important parts leading to re-processing. If a chosen threshold is too low, the procedure may take a longer time. Such manual processing further leads to a need for extra examination of the case and transfers of huge amounts of image data from one station to another, slowing the entire workflow scheme of the facility.

SUMMARY OF THE INVENTION

A method, system and computer-readable medium for filtering noise in image data are provided. The method in one aspect includes determining a signal intensity value for each pixel; determining pixel count for each signal intensity value; further determining intensity value $I_{peak}$, corresponding to a pixel count of a greatest number of pixels, $N_{peak}$; setting a noise threshold at a signal intensity value, $I_{noise}$, corresponding to a pixel count, $N_I$, such that $N_I$ is determined based on $N_{peak}$; and filtering from the image data one or more pixels with signal intensity values below the noise threshold.

Examples of the image data may include but are not limited to magnetic resonance imaging data, computed tomography data, and the like.

In one aspect, $N_I$ may be determined as a function of $N_{peak}$. For example, $N_I$ may be determined such that $N_I=N_{peak}/3$. Also, $N_I$ may be determined so as to filter out pixels with signal intensity values corresponding to values from at least one of saturated fat tissue and air.

Further, such a method may include receiving a pre-contrast signal intensity value $I_0$ and a post-contrast signal intensity value $I_t$ for each pixel of the image, and calculating a signal intensity difference between $I_0$ and $I_t$ for each pixel. The method may also include determining, based on the calculated signal intensity difference for each pixel, a signal intensity difference, $ID_{peak}$, shown by a greatest number of pixels $H_{peak}$; setting a sub-noise threshold at a signal intensity difference $I_{sub-noise}$, shown by a number of pixels, $N_{SI}$, such that $N_{SI}$ is determined based on $H_{peak}$; and filtering from the image data one or more pixels with signal intensity difference between $I_0$ and $I_t$ below the sub-noise threshold.

In one aspect, $N_{SI}$ may be determined as a function of $H_{peak}$. For example, $N_{SI}$ may be determined such that $N_{SI}=H_{peak}/3$.

It will be understood that image data such as magnetic resonance imaging data and/or computed tomography data may be obtained for further implementation of a pharmacokinetic analysis of contrast-enhanced breast tissue. For example, the magnetic resonance imaging and/or computed tomography data may be obtained for further implementation of a pharmacokinetic analysis of contrast-enhanced studies of upper and lower extremities, head and neck.

Also, a method of filtering out non-conforming pixel data of an image obtained from enhancing tissue is provided. Such a method may include identifying a number N of time points at which signal intensity data are obtained for the image; setting $t_1$ as a time point at which a peak signal intensity is expected for tumorous tissue; calculating, based on N and $t_1$, a madness value for each pixel using each time point at which signal intensity is obtained after a pre-selected time point $t_1$; and filtering out pixel data that do not satisfy a pre-determined madness threshold. In one aspect, the image may include but is not limited to magnetic resonance imaging and computed tomography data.

In one aspect, a madness value may be calculated based on the formula:

$$Mad_j = 1 - \frac{|I_{j-1} + I_{j+1} - 2I_j|}{I_{j-1} + I_{j+1}}; \quad j = t_1 + 1 \div N - 1$$

and the madness threshold may be $(R^2-0.1)$, 1.0 being the highest possible madness value.

It will be understood that magnetic resonance imaging and/or computed tomography data may be obtained for further implementation of a pharmacokinetic analysis of contrast-enhanced breast tissue. For example, image data such as the magnetic resonance imaging data may be obtained for further implementation of a pharmacokinetic analysis of contrast-enhanced prostate tissue. For example, image data such the computed tomography data may be obtained for further implementation of a pharmacokinetic analysis of contrast-enhanced lung tissue.

Also contemplated is a method of filtering data of an image obtained from enhancing tissue. The method in one aspect may include identifying qualifying pixels that satisfy an enhancement threshold and a madness threshold by determining an enhancement value for each pixel of the image according to the formula $$E_t = (I_t - I_0)/I_0,$$

where $I_0$ is a pre-contrast signal intensity value of the pixel and $I_t$ is a signal intensity value of the pixel at time t post-contrast, and comparing $E_t$ for each pixel to a pre-specified enhancement threshold and classifying the pixel as a non-qualifying data if the pixel does not satisfy the enhancement threshold, by determining a number N of time points at which signal intensity data are obtained for the image, setting $t_1$ as a time point at which a peak signal intensity value is expected for tumorous tissue and calculating, based on N and $t_1$, a madness value for each pixel using each time point at which signal intensity is obtained after a pre-selected time point $t_1$, and classifying as non-qualifying data of the image one or more pixels below the enhancement threshold and data that do not satisfy the pre-determined madness threshold. The method in one aspect may also include determining a color density for each pixel by, for each pixel of the image, determining, as a color density ratio, a ratio of qualifying pixels to the pixels of the image for a neighborhood of pixels of a pre-specified size, and selecting, as high color density pixels, pixels with a color density ratio above a pre-determined percentile of color density ratios of the qualifying pixels. Examples of the image data may include but are not limited to magnetic resonance imaging data, computed tomography data, and the like.

Such a method may also include receiving pixel count for each signal intensity value of the image and determining a signal intensity value, $I_{peak}$, corresponding to a pixel count of a greatest number of pixels, $N_{peak}$. The method may also include setting the noise threshold at a signal intensity value, $I_{noise}$, with a pixel count $N_I$, such that $N_I$ is determined based on $N_{peak}$ and classifying as non-qualifying data one or more pixels below the noise threshold.

Further, such a method may include detecting a pre-contrast signal intensity value $I_0$ and a post-contrast signal intensity value $I_t$, and calculating a signal intensity difference between $I_0$ and $I_t$ for each pixel of the image and determining, based on the calculated signal intensity difference for each pixel, a signal intensity difference, $ID_{peak}$, shown by a greatest number of pixels $H_{peak}$. The method may also include setting a sub-noise threshold at a signal intensity difference $I_{sub-noise}$, shown by a number of pixels, $N_{SI}$ such that $N_{SI}$ is determined based on $H_{peak}$ and classifying as non-qualifying data one or more pixels with signal intensity difference below the sub-noise threshold. In one aspect, the pre-specified size may be approximately 1 cm³. The pre-determined percentile of color density ratios may be set at approximately 95%.

In one aspect, magnetic resonance imaging and/or computed tomography data may be obtained for further implementation of a pharmacokinetic analysis of contrast-enhanced prostate tissue. The magnetic resonance imaging and/or computed tomography data may be obtained for further implementation of a pharmacokinetic analysis of contrast-enhanced liver tissue and kidney tissue.

Such a method may further include processing for image presentation only pixels near a center of mass, CM, whose position calculation in one aspect may include weighting the color density ratio for each pixel and determining an x-coordinate for CM according to a formula:

$$CM_x = \frac{\sum_{v \in P\%} x_v \cdot ColorDens_v^*}{\sum_{v \in P\%} ColorDens_v^*}$$

where x is an x-coordinate of CM, and P is the pre-determined percentile of color density ratios. The method may also include determining for CM a y-coordinate, $CM_y$, and a z-coordinate, $CM_z$, according to the formula with the sum of the x-coordinates replaced by the sum of the y-coordinates for calculating $CM_y$, and the sum of the x-coordinates replaced by the sum of the z-coordinates for calculating $CM_z$.

In one aspect, the pixels near CM may comprise pixels within a cube approximately 9 cm³ centered at CM for prostate dataset. The pixels near CM may comprise pixels within a cube centered at CM of sufficient size to analyze an organ of interest and some surrounding tissue. In one or more of such methods, each pixel may comprise a voxel.

A method of filtering out pixels corresponding to tissue of an area of non-interest in image data such as magnetic resonance imaging and/or computed tomography data is provided. Such a method may include identifying as cluster centers one or more pixels according to a color density determined for qualifying pixels of the imaging data, the color density determined based on signal intensity time curves of the pixels of the imaging data and growing a cluster unit for the cluster center, by adding to the cluster unit one or more adjacent pixels that are determined to have signal intensity time curves similar to the signal intensity time curve of the cluster center. The method may also include merging the cluster unit with an adjacent cluster unit, when a correlation of the signal intensity time curves of the cluster centers satisfies a predetermined correlation threshold and filtering out merged adjacent cluster units, when the merged cluster units exceeds a pre-determined dimension.

Such a method may further include identifying qualifying pixels that satisfy an enhancement threshold and a madness threshold by determining an enhancement value for each pixel of the image data according to the formula $E_t = (I_t - I_0)/I_0$, where $I_0$ is a pre-contrast signal intensity value of the pixel and $I_t$ is a signal intensity value of the pixel at time t post-contrast, comparing $E_t$ for each pixel to a pre-specified enhancement threshold, classifying the pixel as a non-qualifying data if the pixel does not satisfy the enhancement threshold, determining a number N of time points at which signal intensity data are obtained for the image data, setting $t_1$ as a time point at which a peak signal intensity value is expected for tumorous tissue, calculating, based on N and $t_1$, a madness value for each pixel using each time point at which signal intensity is obtained after a pre-selected time point $t_1$, and filtering out as non-qualifying data one or more pixels below the enhancement threshold and data that do not satisfy the pre-determined madness threshold.

The method also may include detecting a pre-contrast signal intensity value $I_0$ and a post-contrast signal intensity value $I_t$, and calculating a signal intensity difference between $I_0$ and $I_t$ for each pixel of the image data and determining, based on the calculated signal intensity difference for each pixel, a signal intensity difference, $ID_{peak}$, shown by a greatest number of pixels $H_{peak}$. The method may further include setting a sub-noise threshold at a signal intensity difference $I_{sub-noise}$, shown by a number of pixels, $N_{SI}$, such that $N_{SI}$ is determined based on $H_{peak}$ and filtering out as non-qualifying data one or more pixels with signal intensity difference below the sub-noise threshold.

Such a method may further include receiving pixel count for each signal intensity value of the image data and determining a signal intensity value, $I_{peak}$, corresponding to a pixel count of a greatest number of pixels, $N_{peak}$. The method may also include setting the noise threshold at a signal intensity value, $I_{noise}$, with a pixel count $N_f$, such that $N_f$ is determined based on $N_{peak}$ and classifying as non-qualifying data all pixels below the noise threshold.

The color density determination in one aspect may include for each qualifying pixel of the image data, determining, as a color density ratio, a ratio of qualifying pixels to one or more pixels of the image data for a neighborhood of pixels of a pre-specified size and selecting, as high color density pixels, pixels with a color density ratio above a pre-determined percentile of color density ratios of the qualifying pixels.

In one aspect, the pre-specified size may be approximately 1 cm³. For example, only pixels with color density exceeding 98% may be selected for processing. Also, pixels contiguous with a pixel selected as a cluster center may be left as not selected as cluster centers.

In growing the cluster unit, signal intensity time curves may be judged as similar when a correlation coefficient exceeds 0.75, a coefficient of 1.0 being the highest correlation.

In one aspect, the filtering out merged adjacent cluster units may include generating a large cluster unit by merging adjacent cluster units when the correlation between the signal intensity time curves of sets of adjacent cluster centers or adjacent cluster units satisfies the predetermined correlation threshold and filtering out the large cluster unit only when the large cluster unit exceeds approximately 5 cm in length in any direction.

The merging adjacent cluster units in one aspect may include calculating a number of contiguous pixels for the adjacent cluster units, the number being 0 if no pixels of the adjacent cluster units are adjacent and merging two cluster units of the adjacent cluster units with the highest correlation between their respective cluster centers, when the correlation coefficient of the highest correlation exceeds 0.75, a correlation coefficient of 1.0 being the highest coefficient.

The tissue of area of non-interest may be heart tissue. The filtering out may be performed before implementation of pharmacokinetic analysis. Further, the filtering out may be performed before generation of maximum intensity projection images.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1A is a histogram of signal intensities.

FIG. 1B is a schematic diagram of noise threshold finding according to an aspect of the present invention.

FIG. 3 is an example of a fat saturated study for breast tissue, such that:

FIG. 3a shows an image in which all the voxels that pass the enhancement threshold are processed;

FIG. 3b shows an image in which only voxels that pass the enhancement and noise thresholds are processed;

FIG. 3c shows an image in which only voxels that pass the enhancement and noise and sub-noise thresholds are processed;

FIG. 3d shows the subtraction image.

FIG. 4 is an example a MR images for breast tissue, such that:

FIG. 4a shows an image in which all the voxels that pass the enhancement threshold are processed;

FIG. 4b shows an image in which only voxels that pass the enhancement and noise thresholds are processed;

FIG. 4c shows an image in which only voxels that pass the enhancement and noise and sub-noise thresholds are processed;

FIG. 4d shows the subtraction image.

FIG. 5A shows original (blue) and fitted (red) enhancement time curves with a better fit.

FIG. 5B shows original (blue) and fitted (red) enhancement time curves with a lower $R^2$ value than the time curve in FIG. 5a.

FIG. 7A shows a color density map for an MR image including the prostate.

FIG. 7B shows a color density map for an MR image without the prostate.

FIG. 10A shows a breast image processed without the Heart Mask technique.

FIG. 10B shows the same slice as shown in FIG. 10a processed after application of the Heart Mask technique.

FIG. 11A shows a breast image (Maximum Intensity Projection Image) processed without the Heart mark technique.

FIG. 11B shows the same slice as shown in FIG. 11a processed after application of the Heart Mask Technique.

DETAILED DESCRIPTION OF THE INVENTION

Figure 2:
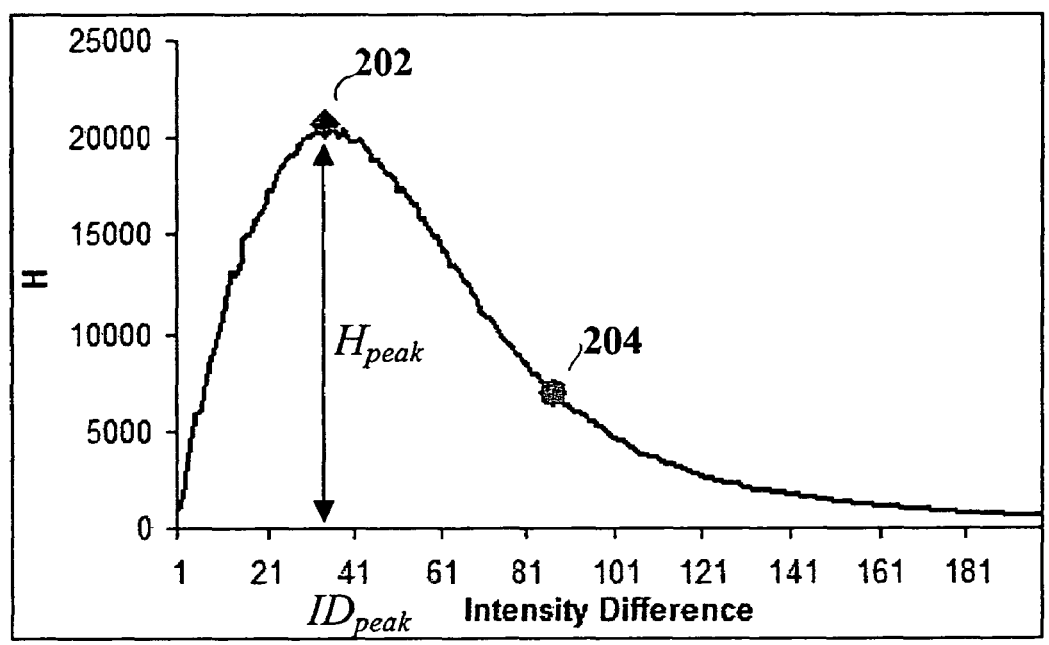
FIG. 2 is a histogram of signal intensity differences, determined according to an aspect of the invention.

The following discussion and the foregoing figures describe embodiments of Applicant's invention as best understood presently by the inventor however, it will be appreciated that numerous modifications of the invention are possible and that the invention may be embodied in other forms and practiced in other ways without departing from the spirit of the invention. Further, features of embodiments described may be omitted, combined selectively or as a whole, with other embodiments, or used to replace features of other embodiments or parts thereof, without departing from the spirit of the invention. The figures and the detailed description are therefore to be considered as an illustrative explanation of aspects of the invention, but should not be construed to limit the scope of the invention.

One or more methods that allow automatic pre-selection of appropriate voxels to consider are provided. In one aspect, the methods of the present disclosure may eliminate the need of human interaction before or during the mathematical processing of the case, until it is completely ready for final interpretation and/or reading by a radiologist. These methods also may shorten the processing time many times and thus make all the advantages of full pharmacokinetic modeling available for everyday use at any imaging facility and in clinical routine, which was not possible before. In another aspect, the new methods and algorithms for automatic pre-selection of the present disclosure also allow for a cleaner appearance of final results, eliminating a big amount of unnecessary information that may distract the user and/or radiologist from evaluating the important regions of interest.

Data images are generally represented in units of picture elements (pixels). A pixel generally refers to the information stored for a single grid in an image or a basic unit of the composition of an image, usually in a two dimensional space, for example, x-y coordinate system. Pixels become volume pixels or voxels in three-dimensional space (x, y, z coordinates). A voxel thus refers to a unit of volume corresponding to the basic element in an image that corresponds to the unit of volume of the tissue being scanned. In the present disclosure, the terms pixels and voxels are used interchangeably to refer to an element in an image. It should be appreciated that the method and system of the present disclosure may utilize pixels, voxels and any other unit representations of an image to achieve the desired objective.

Enhancement Threshold

In an exemplary embodiment, the method of the present disclosure may include a preprocessing step that pre-selects "enhancing" voxels. The enhancement is defined as $E_t=(I_t-I_o)/I_o$, where $I_o$ is the voxel intensity before contrast agent injection (pre-contrast), $I_t$ is the voxel intensity t minutes after contrast agent injection (post-contrast). In an exemplary embodiment, only those voxels passing appropriate preset Enhancement Threshold are later processed.

Auto Noise Threshold for Breast

Figure 3:
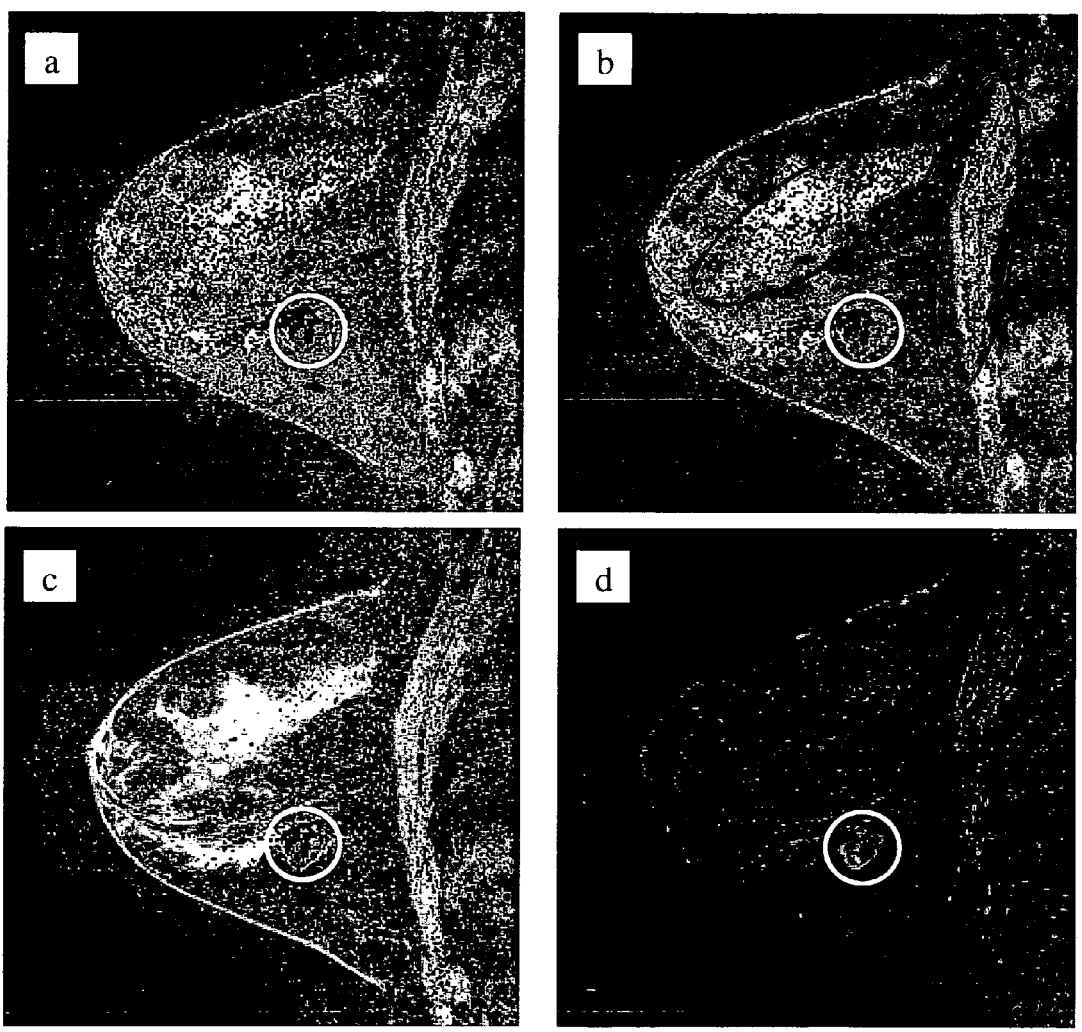
Figure 4:
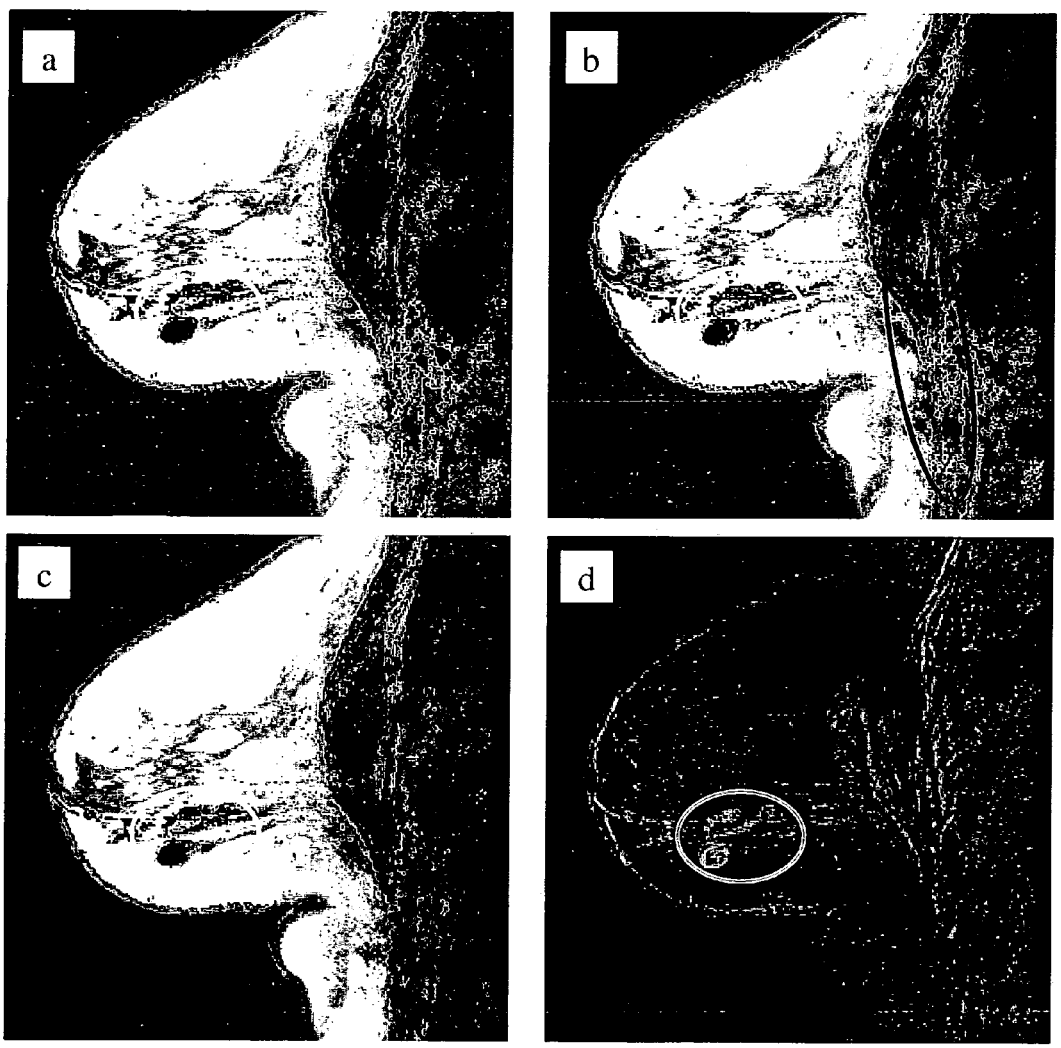

The noise is one of the main problems that always accompany MR and/or CT images. The scan parameters usually are chosen to minimize the noise as much as possible, but that can be challenging. Higher is the useful signal intensity compared to the noise intensity, better is the image quality. Different sequences have different signal and noise levels. For example, the MR scanning sequence (so called "Fat Saturated") used for images in FIG. 3 has higher noise level than the one used in FIG. 4, but it is also widely used in breast imaging because of some other advantages it gives. FIGS. 3a and 4a show the case when the images were processed without any consideration of noise: all the voxels that passed the appropriate Enhancement Thresholds (discussed above) were processed. FIGS. 3d and 4d are subtraction images: the pre-contrast image subtracted from the appropriate post-contrast image. Subtraction images are used by radiologists for visual localization of tumors. The yellow circles correspond to regions of interest and/or tumors.

Finding the noise levels that change from scanner to scanner, sequence to sequence, study to study requires an analysis for each combination of settings, etc., using manual placements of ROIs and subsequent mathematical analysis which is completely unacceptable for usual MR and/or CT facilities with heavy workflow or without a mathematician on premises.

In one embodiment, the method of the present disclosure takes into account some facts about breast imaging, namely: 1. in breast studies the scanned volume usually includes not only the breast itself but also some part of the chest (chest wall, lung, heart) and the air around; 2. there should not be any MR signal from room air, but there are some random signals that are noise; 3. for Fat Saturated sequences (as in FIG. 3) the MR signal from breast and other fatty tissues also has to be suppressed, so it is also usually on the level of noise.

Using these facts, the method and system of the present disclosure in one embodiment provides a technique that automatically finds the level of noise and disregards voxels below that level during further processing. FIG. 1A illustrates a histogram of intensities of pre-contrast set of dynamic images. The analysis of many breast studies shows that the intensity with biggest amount of voxels (marked red) 102 corresponds to the mean noise level of air and fat for Fat Saturated sequences and to the mean noise level of air for other usual breast sequences. In this embodiment, the intensity=0 is not considered. The intensity of the peak is denoted as $I_{peak}$ and the count of voxels at peak intensity is $N_{peak}$. FIG. 1B illustrates the procedure of further determining the Noise Threshold: moving to the right on the intensity axis from the $I_{peak}$, the method and system in one embodiment looks for the intensity value (marked green on FIG. 1A) 104 for which the voxel count is the closest to $N_{peak}/3$. Thus, starting from the next intensity value $I=I_{peak}+1$, compare the voxel count $N_I$ at that intensity I to the $N_{peak}/3$. If $N_I>N_{peak}/3$ or $N_I=0$, move to the next intensity value. If $N_I=N_{peak}/3$, select the current I as Noise Threshold $I_{noise}=I$ and exit. If $N_I<N_{peak}/3$, select I or I-1, whichever has closer pixel count to $N_{peak}/3$, as Noise Threshold and exit.

The examples of processed images after application of Noise Threshold are shown in FIGS. 3b and 4b. FIGS. 3a and 4a show processed images without Noise Thresholding. Red, green and blue colored voxels represent those voxels whose dynamic curves were fitted to the model during post-processing of the images, the choice of color corresponds to the dynamic behavior of the voxels. Enclosed in yellow are the regions of interest. For the study in FIG. 3 the Noise Threshold was 82 and the comparison of FIGS. 3a and 3b shows that the voxels with noise level signals in the air and fatty tissues were excluded from the analysis and are not processed in 3b. For the study in FIG. 4 the Noise Threshold was calculated as 18, and again the comparison of FIGS. 4a and 4b shows no processed and further colorized noise in the air around the breast and in the fragment of lung air in upper right corner in FIG. 4b. The target voxel count $N_{peak}/3$ was chosen based on evaluation of many breast exams: the intensity value corresponding to that voxel count allows for sufficient thresholding of noise from air and fat (for fat saturated sequences), and is low enough for not eliminating voxels from some exams where tumor voxels have low pre-contrast intensities (as in FIG. 4).

In one embodiment, the Noise Threshold is found based on pre-contrast signal intensities of voxels in the study. Application of this threshold means that voxels with pre-contrast intensities less that Noise Threshold are not considered in further analysis.

Comparison of processed and/or colored voxels after applying the Noise Threshold FIGS. 3b and 4b with appropriate subtraction images FIGS. 3d and 4d shows that still some amount of voxels that belong not to the tumors (enclosed in yellow) or heart and/or vessels are still being processed. Those regions are marked in bright blue in FIGS. 3b and 4b. In one embodiment, the method and system of the present disclosure creates another Sub-Noise Threshold using the intensity differences of pre- ($I_0$) and appropriate post-contrast ($I_t$) images, which may further filter unwanted noise.

In one embodiment, to determine a sub-noise threshold, histogram H is created as follows: for each voxel in the study if $I_t-I_0>0$ add 1 to $H_{It-I0}$, otherwise if $I_t-I_0<0$ subtract 1 from $H_{I0-It}$. Thus, 1 is subtracted from the histogram bin (count) corresponding to the value (I0–It). FIG. 2 shows an example of such histogram. The use of such histogram based on the subtracted intensities is based on the following observations: usually the images obtained after contrast agent injection have higher intensities compared to the pre-contrast images not only in directly enhancing primary target tissues/tumors, but also image artifacts and patient motion can appear as enhancements. This histogram is expected to have a peak voxel count for intensity differences at false intensity increase level. Then the same procedure used to determine Noise Threshold described above and shown in FIG. 1B may be employed for this new histogram H. For example, by finding the peak $H_{peak}$ (marked red) 202 and corresponding Intensity Difference $ID_{peak}$, then the Intensity Difference corresponding to $H_{peak}/3$ (marked pink) 204. That Intensity Difference is termed Sub-Noise Threshold. If a method applies this new threshold, the voxels with $I_t-I_0<$Sub-Noise Threshold would not be considered in further analysis.

FIGS. 3c and 4c show the examples of the same slices as in FIGS. 3a,b and 4a,b but processed after applying both Noise and Sub-Noise thresholds together. Cleaner view inside the breast and especially in chest wall can be seen in FIGS. 3c and 4c compared to FIGS. 3a,b and 4a,b. In one embodiment, these two Noise and Sub-Noise Thresholds are applied together, simply addressing them as Noise Thresholding.

Madness Threshold

In one embodiment of the present disclosure, a madness threshold may be used for sorting out voxels that display chaotic, or erroneous dynamic behavior that cannot be explained by the underlying physiology of the tissues or average level of noise. Madness threshold may apply to breast, prostate and any pharmacokinetic fitting procedure. As it was described in the background section, the pharmacokinetic analysis includes choosing the appropriate model and fitting the actual time curves of the voxels that pass some applicable thresholds to the model looking for best fit. Examples of such multi-compartmental models may include, but are not limited, to Brix' model, Larsson's model, Tofts' model and their modifications. For example, in FIG. 5A and FIG. 5B two examples of fitted curves to the Tofts' four compartment pharmacokinetic model are shown.

The curve fitting is a time-consuming procedure, and not all the curves that pass the Noise and Enhancement Thresholds can possibly be fitted to the model with good enough fit (e.g. $R^2 \geq 0.75$). Some reasons for that can be the irregular shape of the time curve caused by the noise, motion, image artifacts. Based on the analysis of the curves, the method and system of the present disclosure in one embodiment creates an easy measure that sorts out and excludes at least some of the "unfittable" curves from the further analysis. For each voxel for each time point after the pre-selected time point $t_1$, the value described by the following formula is calculated:

$$Mad_j = 1 - \frac{|I_{j-1} + I_{j+1} - 2I_j|}{I_{j-1} + I_{j+1}}; \quad j = t_1 + 1 \div N - 1$$

Figure 6A:
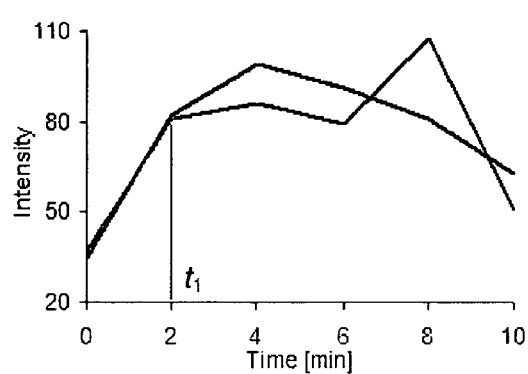
FIG. 6A shows time curves with lower (red) and higher (blue) madness values.

N is the total number of the time points for the dynamic study, and $t_1$ is an expected time for peak enhancement of cancers for specific organ. Then the method and system of the present disclosure in one embodiment selects the minimal Madj for that voxel as the "madness" parameter for that voxel. The maximal possible value of madness is 1, which corresponds to the straight line after $t_1$. The dynamic curves with irregular/noisy/broken behavior after the expected enhancement peak will have lower madness values. FIG. 6A presents two time curve examples, the Madness for red curve is 0.43 and for blue curve it is 0.855. Thus lower the madness value, more irregular is the voxels dynamic behavior, less possible to fit such curve to the model.

Figure 6B:
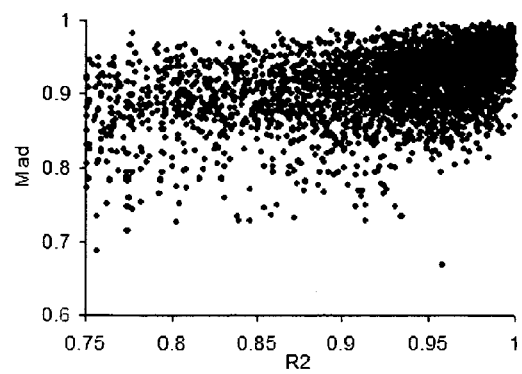
FIG. 6B shows a scatter plot of $R^2$ versus madness value of the fitted curves.

For example, an analysis of ideal time curves created using Tofts' pharmacokinetic model shows that the lowest possible value for Madness is about 0.85. Also the Madness of actual curves with usual noise levels that were fitted to the model with $R^2 \geq 0.75$ were analyzed. FIG. 6B presents an example of scatter plot of Madness versus quality of fit $R^2$ for a breast exam. As FIG. 6b shows, only voxels with Madness $\geq 0.7$ (only 2 exceptions) were fitted with preset $R^2 \geq 0.75$ value.

Thus, the method and system of the present disclosure in one embodiment creates another pre-selection threshold that is calculated for voxels that pass Noise and Enhancement Thresholds—"Madness Threshold." In one embodiment of the present disclosure, only those voxels with higher than ($R^2-0.1$) Madness will be tried to fit. This saves the time of unlucky trials to fit the voxels that cannot be possibly fitted to the model with good enough fit.

In one embodiment, the same Madness Threshold ($R^2-0.1$) applies to the prostate pharmacokinetic modeling. Also for other organs and models it can be easily estimated. Applied prior to other, simpler methods that create parametric maps, this thresholding can help to lower the amount of erroneous results. For example, if a model uses the signal intensities at time points 2 min and 8 min (see, FIG. 6A) then results for red curve will be highly erroneous, because of the irregular shape of the curve.

Color Density Selection ("The Tissue in the Box")

Color density selection scheme may be used with prostate study and can also be used for imaging the liver, kidney and other dense enhancing tissues with appropriate adjustments. For each voxel in an image (for example, the prostate) that passes Noise and Madness thresholds as well as the Enhancement threshold, the method and system in one embodiment calculates the Color Density:

$$ColorDens_{voxel} = \frac{N_{Qualifying\ Neighbors}}{N_{All\ Neighbors}}.$$

$N_{AllNeighbors}$ is the number of all existing neighbors of the current voxel in a pre-specified size neighborhood, for instance, 1 cm×1 cm×1 cm neighborhood. $N_{QualifyingNeighbors}$ is the number of voxels in the same neighborhood passing the Noise, Madness and Enhancement thresholds, thus qualified to be processed. The ColorDens represents the fraction of the All Neighbors of the current voxel that would be qualified for being processed ($0 \leq ColorDens_{voxel} \leq 1$). FIG. 7A shows an example of Color Density map for a slice containing prostate. FIG. 7B shows an example of Color Density map for a slice without prostate. Analysis of more than 50 cases shows that the voxels of prostate usually have the highest color densities (white box in FIG. 7A) compared with surrounding tissues.

From the whole amount of qualifying voxels the method and system of the present disclosure in one embodiment chooses the 5% with highest Color Densities. For those 5% voxels, the method and system of the present disclosure in one embodiment calculates the "center of mass" as follows:

$$CM_x = \frac{\sum_{v \in 5\%} x_v \cdot ColorDens_v}{\sum_{v \in 5\%} ColorDens_v}$$

Where $x_v$ is the position of voxels and $CM_x$ is the position of center of mass in X direction of three dimensional volume of images. The same is done for Y and Z directions.

In one embodiment, the method and system of the present disclosure uses the weighted color densities (ColorDens$_v$*) in the previous formula instead of ColorDens$_v$:

$$ColorDens_v^* = \frac{ColorDens_v}{\sqrt{\left(1+\left|\frac{Nx}{2}-x_v\right|\right)\left(1+\left|\frac{Ny}{2}-y_v\right|\right)\left(1+\left|\frac{Nz}{2}-z_v\right|\right)}}$$

This makes the position of the center of mass more stable in case of motion related or other unusual enhancements close to the edges of the 3D volume that was scanned.

After the three coordinates of the center of mass are calculated $CM_{x,y,z}$, only the voxels that are in the 9 cm×9 cm×9 cm cube are further analyzed. In one embodiment, 9 cm for cube edge is recommended for prostate. This dimension encloses the prostate and some surrounding tissues that may be also useful to analyze. For other organs this size should be adjusted accordingly.

Figure 8A:
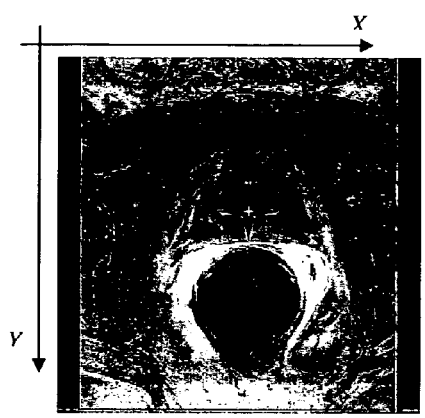
FIG. 8A shows a color density map for an MR image with the highest 5% of color density voxels colored.
Figure 8B:
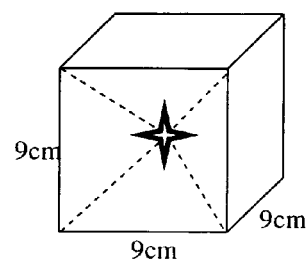
FIG. 8B is a schematic presentation of a 9 cm³ cube with a center shown by a star.
Figure 8C:
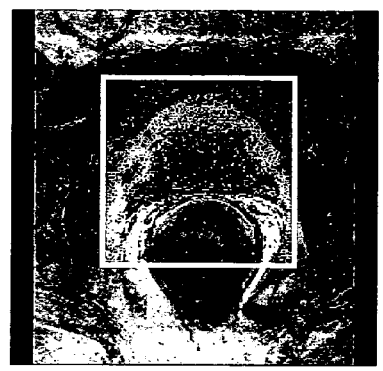
FIG. 8C shows an example of post-processed MR image (8a) where only the pixels in the cube (8b) were processed.

FIG. 8A presents the same slice as in FIG. 7A with only 5% highest Color Density voxels colored in red. The blue star corresponds to the center of mass in XY plane of the image. FIG. 8C shows the same slice where only the voxels in the white box were further processed and colored blue, green and red.

Figure 9:
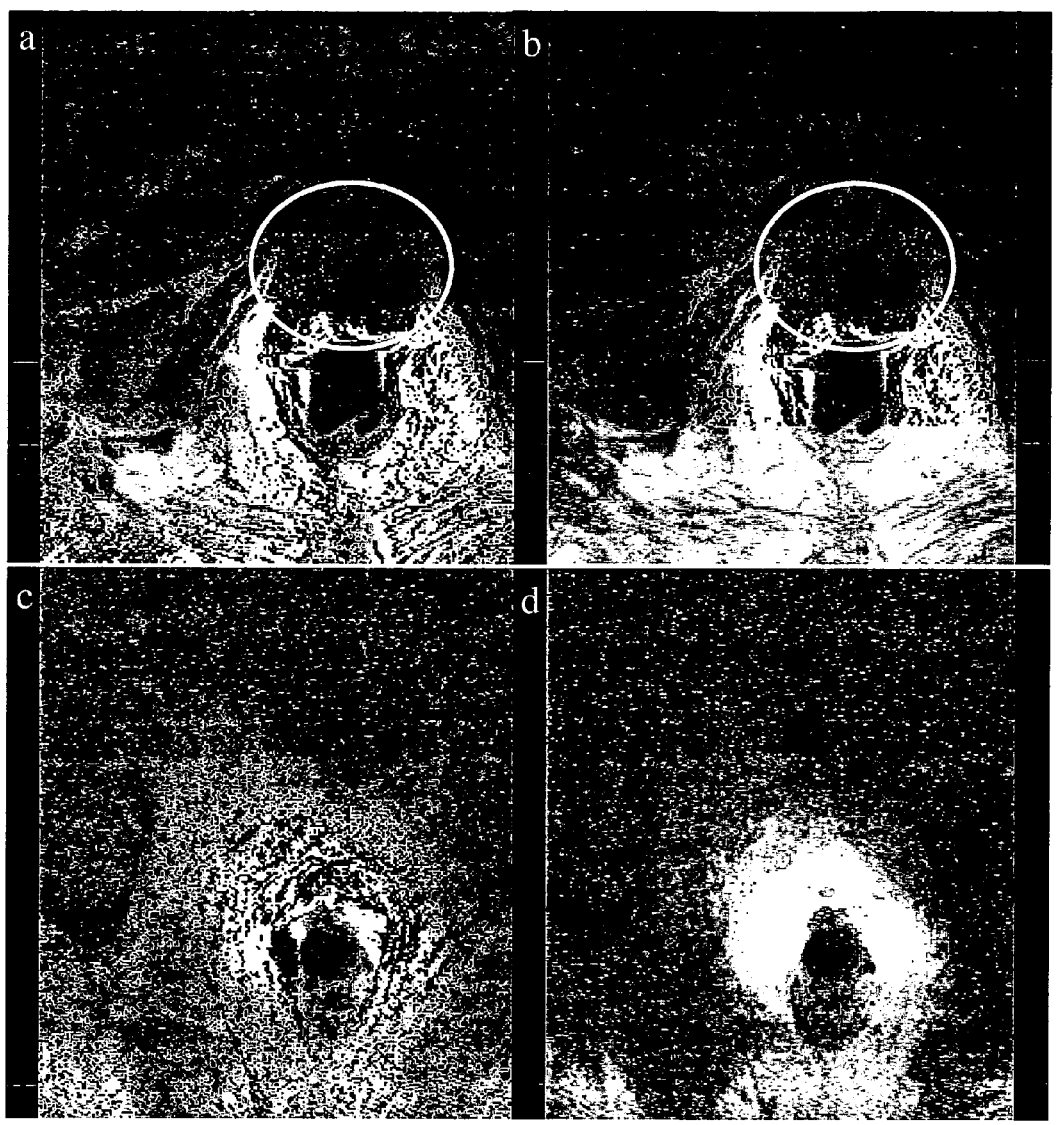
FIGS. 9a and 9c show MR images of a post-processed prostate study and surrounding tissue.
FIGS. 9b and 9d show the identical slices after application of the "prostate in a box" technique.

FIG. 9 presents two slices from another study, processed completely (a), (c) and with the application of the "Prostate in the Box" technique described above (b), (d). The colored pixels in the images (red, green and blue) correspond to the voxels that were processed and successfully fitted to the model. The first slice (a) and (b) show the prostate enclosed in white oval to show its position. As shown in the figures, only the voxels in the prostate and surroundings are processed on image (b), saving the time on unnecessary modeling of the rest of the image (as in (a)) that does not cover our organ of interest. FIG. 9(c) and FIG. 9(d) illustrate the same slice, which was not covering the prostate. FIG. 9d illustrates that "Prostate in the Box" technique used on the slice resulted in none of the voxels being processed. Without the "Prostate in the Box" technique the voxels of this slice would be processed (FIG. 9c), which would result in unnecessary waste of the time and computing resources. This method with appropriate adjustments of parameters used, can also be used for imaging of the liver, kidney and other dense enhancing tissues and organs.

Figure 12:
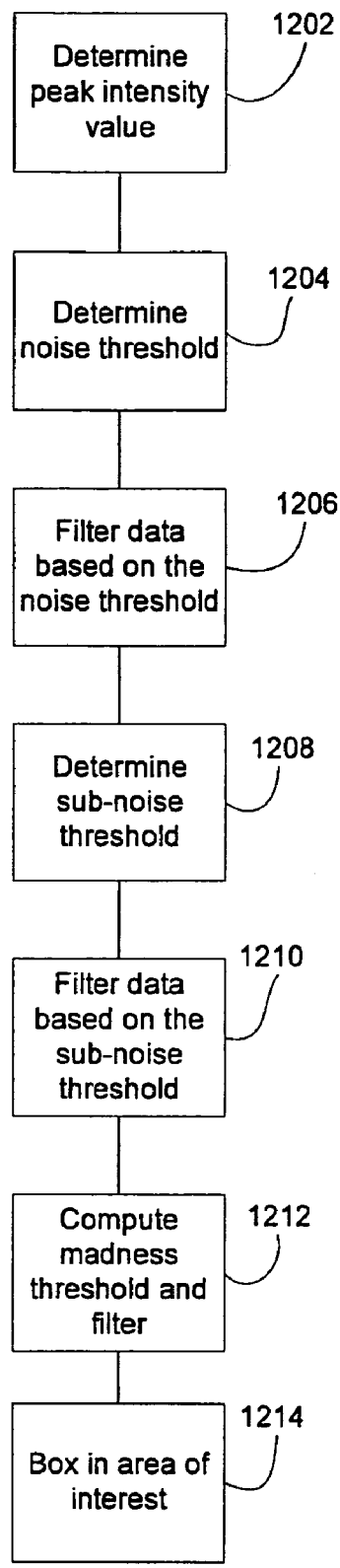
FIG. 12 is a flow diagram illustrating a method of filtering noise in one embodiment.

FIG. 12 is a flow diagram illustrating a method of filtering noise in one embodiment. At 1202, signal intensity value $I_{peak}$, corresponding to an intensity value identified with greatest number of picture elements (for example, pixels or voxels) $N_{peak}$ is determined. At 1204, noise threshold at a signal intensity value, $I_{noise}$, corresponding to an intensity value identified with a picture element count $N_I$, is determined. In one embodiment, $N_I$ is determined as a function of $N_{peak}$. At 1206, one or more picture elements with signal intensity value not meeting the noise threshold level are filtered. Optionally at 1208, sub-noise threshold is determined based on pre-contrast and post-contrast image data and at 1210, one or more picture elements with signal intensity value not meeting the sub-noise threshold level are further filtered. At 1212, a madness threshold is computed, for example, to sort and exclude data that contributes to "unfittable" curves from further analysis. At 1214, picture elements are further filtered to box in the area of interest, for example, according to the color density scheme described above. The step at 1214 may be performed for example for certain organs such as the prostate. It should be understood that every thresholding or filtering step is not necessary, rather some may be performed optionally.

The Heart Mask

In breast or lung imaging sequences the scanned field of view usually includes the heart. In the dynamic contrast enhanced studies heart and some parts of the chest wall usually show substantial enhancement and pass Noise, Sub-Noise, Enhancement and Madness thresholds, thus qualify for further processing. Because of its relative big size, considerable amount of processing time is spent on heart and nearby structures that are not the tissues of interest.

Figure 13:
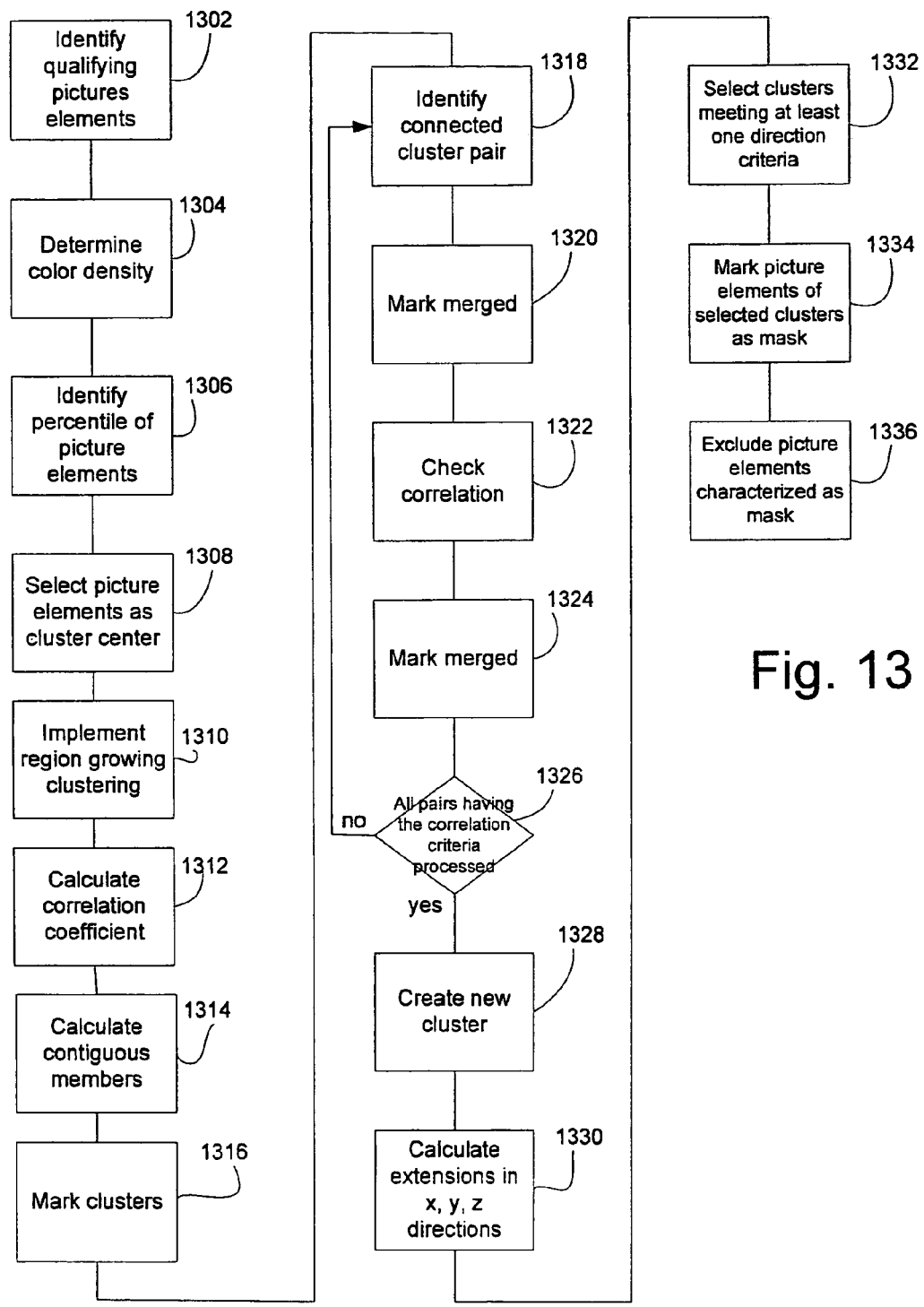
FIG. 13 is a flow diagram illustrating a method of filtering out data corresponding to an area of non-interest.

An embodiment of the present disclosure describes a technique that identifies and excludes the voxels of heart, or for example other organs, and connected nearby tissues from further analysis and/or processing. FIG. 13 is a flow diagram illustrating a method of filtering out data corresponding to an area of non-interest. At 1302, the qualifying picture elements (for example, pixels, voxels) are identified that pass the Enhancement, Madness, Noise/2 and Sub-Noise/2 thresholds, for example, as described above. At 1304, the Color Density is calculated for qualified picture elements such as voxels, for example, as described above. At 1306, the 98% percentiles for Color Density ($CD_{98\%}$) and Enhancement ($E_{98\%}$) of qualifying voxels are identified. At 1308, the voxels are selected that have Color Density>$CD_{98\%}$ and Enhancement>$E_{98\%}$ and appropriate dynamic time curve as Cluster Centers, ignoring the voxels that have at least one contiguous voxel already selected as a Cluster Center. Analysis of a number of cases shows that usually the heart voxels pass these two final thresholds and become Cluster Centers.

At 1310, Region Growing clustering is implemented for each Cluster Center$_j$ (J=1÷N$_{clusters}$): for each qualifying voxel i that has a contiguous voxel in a Cluster$_j$ correlation coefficient between the time curves of the voxel i and Cluster Center$_j$ is calculated. If the correlation coefficient is more than 0.75 (1 is the possible maximum in one embodiment) that voxel i will be attached to the Cluster$_j$. At 1312, for each pair of clusters the correlation coefficient between the time curves of Cluster Centers: Correl$_{ij}$ (i,j=1÷N$_{clusters}$) is calculated.

At 1314, for each pair of clusters the number of contiguous members (0, if clusters are not "connected") is calculated. At 1316, all the Clusters are marked as "not merged". At 1318, the "connected" cluster pair i and j with highest Correl$_{ij}$>0.75 is identified, where at least one of i and j are "not merged". At 1320, if both i and j are "not merged", both are marked as "merged". At 1322, if for example i was previously merged and j-not: the Correl$_{j(i)}$ of j with all the clusters that i was merged previously (i) is checked. At 1324, if all Correl$_{j(i)}$>0.75, j is marked as "merged" to (i). At 1326, steps 1318 to 1324 are repeated, until all pairs i and j with Correl$_{ij}$>0.75 are processed. At 1328, new clusters are created combining the ones that were "merged" together. At 1330, for all clusters the extensions in x/y/z directions using the voxel sizes are calculated. At 1332, all the clusters are selected that have extension in at least one direction more than 5 cm. At 1334, all the voxels of selected clusters at step 1332 are marked as "mask", for instance "Heart Mask" when filtering out the heart area. At 1336, all the voxels that pass Noise, Sub-Noise, Enhancement and Madness thresholds, but belong to the "Heart Mask" are excluded from further analysis.

FIG. 10A illustrates an example of a dynamic contrast enhanced breast MRI study. All the voxels that pass Noise, Sub-Noise, Enhancement and Madness thresholds were processed and colored red, green or blue. As shown, voxels of the heart and contiguous areas of chest wall are processed. While in FIG. 10B, almost all the heart and the left side of chest wall were excluded after application of the Heart Mask technique described above.

This technique can also be used for "cleaning" the Maximum Intensity Projection (MIP) images, where the whole 3D volume is projected into one plain. There important structures can be obscured by the high intensities of the heart and other enhancing unwanted structures. FIG. 11A illustrates an example of MIP images without the Heart Mask and FIG. 11B illustrates an example of MIP with the Heart Mask.

The present disclosure described a noise thresholding technique in one embodiment. Additional noise thresholding technique based on subtracted image intensities for filtering from the image data pixels with intensities at the noise level was described. Further, a filtering technique to exclude the voxels with erroneous, noisy dynamic behavior from further analysis, color density filtering and a masking technique for removing one or more organ tissues from being processed, density filtering and a masking technique for selecting only the tissue or organ of interest from the whole image data for further processing were described.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server.

While preferred embodiments of the invention have been described, it will be understood that various modifications and changes in form or detail could readily be made without departing from the spirit of the invention. It is therefore intended that the invention be not limited to the exact forms described and illustrated, but should be construed to cover all modifications that may fall within the scope of the appended claims.

We claim:

1. In a computer system comprising at least one input device, at least one processor, and at least one output device, a method of identifying noise in image data obtained from enhancing tissue, comprising:
   by means of at least one input device, receiving input data comprising a pre-contrast signal intensity value $I_0$ for a plurality of pixels of the image data;
   by means of at least one processor, determining, for each pre-contrast signal intensity value $I_0$, a pixel count N of pixels having said pre-contrast signal intensity value,
   by means of at least one processor, determining a pre-contrast signal intensity value, $I_{peak}$, corresponding to a pixel count of a greatest number of pixels, $N_{peak}$, in the image data;
   setting a pre-contrast noise threshold at a signal intensity value, $I_{noise}$, corresponding to a pixel count, $N_I$, determined based on $N_{peak}$;
   by means of at least one processor, identifying in the image data one or more pixels with pre-contrast signal intensity values below the pre-contrast noise threshold;
   by means of at least one processor, processing post-contrast data associated with at least some pixels with pre-contrast signal intensity values above the pre-contrast noise threshold; and
   by means of at least one output device, outputting processed post-contrast data associated with said pixels having pre-contrast signal intensity values above the pre-contrast noise threshold.

2. The method of claim 1, wherein the image data includes at least magnetic resonance imaging data or computed tomography data.

3. The method of claim 1, wherein $N_I=N_{peak}/3$.

4. The method of claim 1, wherein $N_I$ is determined so as to identify pixels with signal intensity values corresponding to values from at least one of saturated fat tissue and air.

5. In a computer system comprising at least one input device, at least one processor, and at least one output device, a method of identifying noise in image data, comprising:
   by means of at least one input device, receiving input data comprising a pre-contrast signal intensity value $I_0$ and a post-contrast signal intensity value $I_t$ for a plurality of pixels of the image data;
   by means of at least one processor, calculating a signal intensity difference ID between $I_0$ and $I_t$ for each of a plurality of pixels;
   by means of at least one processor, determining a pixel count H of pixels having each signal intensity difference ID;
   by means of at least one processor, determining, based on the calculated signal intensity difference for each pixel, a signal intensity difference, $ID_{peak}$, shown by a greatest number of pixels $H_{peak}$;
   setting a sub-noise threshold at a signal intensity difference $I_{subnoise}$, corresponding to a pixel count $N_{S1}$, determined based on $H_{peak}$;
   by means of at least one processor, identifying in the image data one or more pixels with a signal intensity difference below the sub-noise threshold;
   by means of at least one processor, processing data associated with at least some pixels with a signal intensity difference above the sub-noise threshold; and
   by means of at least one output device, outputting processed data associated with said pixels with a signal intensity difference above the sub-noise threshold.

6. The method of claim 5, wherein $N_{S1}=H_{peak}/3$.

7. The method of claim 5, further comprising a pharmacokinetic analysis of contrast-enhanced breast tissue in the image data.

8. The method of claim 5, further comprising a pharmacokinetic analysis of contrast-enhanced studies of upper and lower extremities, head and neck in the image data.

9. In a computer system comprising at least one input device, at least one processor, and at least one output device, a method of identifying non-conforming pixel data in an image obtained from enhancing tissue, said method comprising:

by means of at least one input device, receiving pixel data for the image, identifying a number N of time points at which signal intensity data are obtained for the image;

setting $t_1$ as a time point at which a peak signal intensity is expected for tumorous tissue;

by means of at least one processor, calculating, based on N and $t_1$, a madness value for a plurality of pixels using a plurality of time points at which signal intensity is obtained after time point;

by means of at least one processor, identifying pixel data that do not satisfy a pre-determined madness threshold;

by means of at least one processor, processing data associated with at least some pixels which satisfy the madness threshold; and by means of at least one output device, outputting processed data associated with said pixels which satisfy the madness threshold.

10. The method of claim 9, wherein the image includes at least magnetic resonance imaging data or computed tomography data.

11. The method of claim 9, wherein the madness value is calculated based on the formulas:

$$Mad_{j \underset{min \in j}{=}} 1 - \frac{|I_{j-1} + I_{j+1} - 2I_j|}{I_{j-1} + I_{j+1}}; \quad j = t_1 + 1 \div N - 1$$

and the madness threshold is ($R^2 - 0.1$), 1.0 being the highest possible madness value and $R^2$ is the parameter controlling quality of the fit, and j values range from $t_t+1$ to N−1.

12. The method of claim 9, further comprising a pharmacokinetic analysis of contrast-enhanced breast tissue in the image data.

13. The method of claim 9, further comprising a pharmacokinetic analysis of contrast-enhanced prostate and any other tissue in the image data.

14. In a computer system comprising at least one input device, at least one processor, and at least one output device, a method of identifying noise data in an image obtained from enhancing tissue, the method comprising:

by means of at least one input device, receiving pixel data for the image, by means of at least one processor, identifying one or more qualifying pixels that satisfy a threshold by at least:

determining a number N of time points at which signal intensity data are obtained for the image;

setting $t_t$ as a time point at which a peak signal intensity value is expected for tumorous tissue;

by means of at least one processor, calculating, based on N and $t_t$, a madness value for a plurality of pixels using a plurality of time points at which signal intensity is obtained after time point $t_t$; and by means of at least one processor, classifying as qualifying data of the image one or more pixels that satisfy a pre-determined madness threshold;

by means of at least one processor, determining a color density for a plurality of pixels by at least:

by means of at least one processor, for each of a plurality of pixels of the image, determining, as a color density ratio, a ratio of qualifying pixels to total pixels for a neighborhood of pixels of a pre-specified size; and by means of at least one processor, selecting, as high color density pixels, pixels with a color density ratio above a pre-determined percentile of color density ratios of the qualifying pixels; and by means of at least one output device, outputting image data comprising color density information.

15. The method of claim 14, wherein the image includes at least magnetic resonance imaging data or computed tomography data.

16. The method of claim 14, wherein the pixel data for an image comprises a pre-contrast signal intensity value $I_0$ for a plurality of pixels; and wherein identifying one or more qualifying pixels that satisfy a threshold further comprises:

by means of at least one processor, determining, for each pre-contrast signal intensity value $I_0$, a pixel count N of pixels having said pre-contrast signal intensity value, by means of at least one processor, determining a pre-contrast signal intensity value, $I_{peak}$, corresponding to a pixel count of a greatest number of pixels, $N_{peak}$ in the image data;

setting a pre-contrast noise threshold at a signal intensity value, $I_{noise}$, corresponding to a pixel count $N_f$, determined based on $N_{peak}$; and by means of at least one processor, classifying as qualifying one or more pixels with pre-contrast signal intensity values above the pre-contrast noise threshold.

17. The method of claim 14, wherein the pixel data for an image comprises a pre-contrast signal intensity value $I_0$ and a post-contrast signal intensity value $I_t$ for a plurality of pixels; and wherein identifying one or more qualifying pixels that satisfy a threshold further comprises:

by means of at least one processor, calculating a signal intensity difference ID between $I_0$ and $I_t$ for each of a plurality of pixels of the image;

by means of at least one processor, determining a pixel count H of pixels having each signal intensity difference ID:

by means of at least one processor, determining, based on the calculated signal intensity difference for each pixel, a signal intensity difference, $ID_{peak}$, shown by a greatest number of pixels $H_{peak}$;

setting a sub-noise threshold at a signal intensity difference $I_{sub-noise}$, corresponding to a pixel count $N_{SI}$, determined based on $H_{peak}$; and by means of at least one processor, classifying as qualifying one or more pixels above the sub-noise threshold.

18. The method of claim 14, wherein the pre-specified size is approximately 1 cm$^3$.

19. The method of claim 14, wherein the pre-determined percentile of color density ratios is approximately 95%.

20. The method of claim 14, further comprising a pharmacokinetic analysis of contrast-enhanced prostate tissue in the image data.

21. The method of claim 14, further comprising a pharmacokinetic analysis of contrast-enhanced liver tissue and kidney tissue in the image data.

22. The method of claim 14, further comprising identifying pixels near a center of mass, CM, whose position calculation comprises at least:

by means of at least one processor, determining an x-coordinate for CM according to a formula:

$$CM_x = \frac{\sum\limits_{v \text{ above } P\%} x_v \cdot ColorDens_v^*}{\sum\limits_{v \text{ above } P\%} ColorDens_v^*}$$

where $CM_x$ is an x-coordinate of CM, P is the pre-determined percentile of color density ratios, $x_v$ is an x-coordinate for pixel v, and $$ColorDens_v^* = \frac{ColorDens_v}{\sqrt{\left(1+\left|\frac{Nx}{2}-x_v\right|\right)\left(1+\left|\frac{Ny}{2}-y_v\right|\right)\left(1+\left|\frac{Nz}{2}-z_v\right|\right)}};$$

where $N_x$, $N_y$ and $N_z$ are the number of pixels in the x, y, and z directions in the neighborhood of pixels of the pre-specified size, $ColorDens_v$ is the color density ratio of pixel v, and determining for CM a y-coordinate, $CM_y$, and a z-coordinate, $CM_z$, according to the formula with a weighted sum of the x-coordinates replaced by a weighted sum of the y-coordinates for calculating $CM_y$, and a weighted sum of the x-coordinates replaced by a weighted sum of the z-coordinates for calculating $CM_z$.

23. The method of claim 22, wherein the pixels near CM comprise pixels within a cube approximately 9 cm$^3$ centered at CM for prostate imaging.

24. The method of claim 22, wherein the pixels near CM comprise pixels within a cube centered at CM of sufficient size to analyze an organ of interest and some surrounding tissue.

25. The method of claim 1, wherein the pixel comprises a voxel.

26. A program storage device readable by machine, tangibly embodying a program of instructions executable by the machine to perform a method of identifying noise in image data obtained from enhancing tissue, comprising:
by means of at least one input device, receiving input data comprising a pre-contrast signal intensity value $I_0$ for a plurality of pixels of the image data;
by means of at least one processor, determining, for each pre-contrast signal intensity value $I_0$, a pixel count N of pixels having said pre-contrast signal intensity value,
by means of at least one processor, determining a pre-contrast signal intensity value, $I_{peak}$, corresponding to a pixel count of a greatest number of pixels, $N_{peak}$, in the image data;
setting a pre-contrast noise threshold at a signal intensity value, $I_{noise}$, corresponding to a pixel count, $N_I$, determined based on $N_{peak}$;
by means of at least one processor, identifying in the image data one or more pixels with pre-contrast signal intensity values below the pre-contrast noise threshold;
by means of at least one processor, processing post-contrast data associated with at least some pixels with pre-contrast signal intensity values above the pre-contrast noise threshold; and
by means of at least one output device, outputting processed post-contrast data associated with said pixels having pre-contrast signal intensity values above the pre-contrast noise threshold.

27. The program storage device of claim 26, wherein the image data includes at least magnetic resonance imaging data or computed tomography data.

28. A program storage device readable by machine, tangibly embodying a program of instructions executable by the machine to perform a method of identifying noise in image data, comprising:
by means of at least one input device, receiving input data comprising a pre-contrast signal intensity value $I_0$ and a post-contrast signal intensity value $I_t$ for a plurality of pixels of the image data;
by means of at least one processor, calculating a signal intensity difference ID between $I_0$ and $I_t$ for each of a plurality of pixels;
by means of at least one processor, determining a pixel count H of pixels having each signal intensity difference ID;
by means of at least one processor, determining, based on the calculated signal intensity difference for each pixel, a signal intensity difference, $ID_{peak}$, shown by a greatest number of pixels $H_{peak}$;
setting a sub-noise threshold at a signal intensity difference $I_{subnoise}$, corresponding to a pixel count $N_{SI}$, determined based on $H_{peak}$;
by means of at least one processor, identifying in the image data one or more pixels with a signal intensity difference below the sub-noise threshold;
by means of at least one processor, processing data associated with at least some pixels with a signal intensity difference above the sub-noise threshold; and
by means of at least one output device, outputting processed data associated with said pixels with a signal intensity difference above the sub-noise threshold.

29. A program storage device readable by machine, tangibly embodying a program of instructions executable by the machine to perform a method of identifying noise in image data, comprising:
by means of at least one input device, receiving pixel data for an image,
identifying a number N of time points at which signal intensity data are obtained for the image data;
setting $t_I$ as a time point at which a peak signal intensity is expected for tumorous tissue;
by means of at least one processor, calculating, based on N and $t_I$, a madness value for a plurality of pixels using a plurality of time points at which signal intensity is obtained after time point $t_I$;
by means of at least one processor, identifying pixel data that do not satisfy a pre-determined madness threshold
by means of at least one processor, processing data associated with at least some pixels which satisfy the madness threshold; and
by means of at least one output device, outputting processed data associated with said pixels which satisfy the madness threshold
wherein the madness value is calculated based on the formula:

$$Mad_j \underset{min \in j}{=} 1 - \frac{|I_{j-1} + I_{j+1} - 2I_j|}{I_{j-1} + I_{j+1}}; \quad j = t_1 + 1 \div N - 1$$

and the madness threshold is ($R^2 - 0.1$), 1.0 being the highest possible madness value and $R^2$ is the parameter controlling quality of the fit, and j values range from $t_i+1$ to $N-1$.

30. A program storage device readable by machine, tangibly embodying a program of instructions executable by the machine to perform a method of identifying noise in image data, comprising:

by means of at least one input device, receiving pixel data for an image comprising a pre-contrast signal intensity value $I_0$ for a plurality of pixels, by means of at least one processor, identifying one or more qualifying pixels that satisfy a madness threshold, and a noise threshold by at least:

determining a number N of time points at which signal intensity data are obtained for the image data;

setting $t_f$ as a time point at which a peak signal intensity value is expected for tumorous tissue;

by means of at least one processor, calculating, based on N and $t_f$, a madness value for a plurality of pixels using a plurality of time points at which signal intensity is obtained after time point $t_f$;

by means of at least one processor, classifying as qualifying data of the image data, one or more pixels that satisfy a pre-determined madness threshold;

by means of at least one processor, determining, for each pre-contrast signal intensity value $I_0$, a pixel count N of pixels having said pre-contrast signal intensity value, by means of at least one processor, determining a pre-contrast signal intensity value, $I_{peak}$, corresponding to a pixel count of a greatest number of pixels, $N_{peak}$ in the image data;

setting a pre-contrast noise threshold at a signal intensity value, $I_{noise}$, corresponding to a pixel count $N_f$, determined based on $N_{peak}$;

by means of at least one processor, classifying as qualifying one or more pixels with pre-contrast signal intensity values above the pre-contrast noise threshold; and by means of at least one processor, determining a color density for a plurality of pixels by at least:

by means of at least one processor, for each of a plurality of pixels of the image, determining, as a color density ratio, a ratio of qualifying pixels to total pixels for a neighborhood of pixels of a pre-specified size;

by means of at least one processor, selecting, as high color density pixels, pixels with a color density ratio above a pre-determined percentile of color density ratios of the qualifying pixels; and by means of at least one output device, outputting image data comprising color density information.

31. The program storage device of claim 30, wherein the image data includes at least magnetic resonance imaging data or computed tomography data or combination thereof.

32. The program storage device of claim 30, wherein the pixel data for an image further comprises a post-contrast signal intensity value $I_t$ for a plurality of pixels, further comprising, by means of at least one processor, identifying one or more qualifying pixels that satisfy a sub-noise threshold by at least:

by means of at least one processor, calculating a signal intensity difference ID between $I_0$ and $I_t$ for each of a plurality of pixels of the image;

by means of at least one processor, determining a pixel count H of pixels having each signal intensity difference ID:

by means of at least one processor, determining, based on the calculated signal intensity difference for each pixel, a signal intensity difference, $ID_{peak}$, shown by a greatest number of pixels $H_{peak}$;

setting a sub-noise threshold at a signal intensity difference $I_{sub-noise}$, corresponding to a pixel count $N_{SP}$ determined based on $H_{peak}$; and by means of at least one processor, classifying as qualifying one or more pixels above the sub-noise threshold.

33. The program storage device of claim 32, wherein the pre-specified size is approximately 1 cm$^3$.

34. In a computer system comprising at least one input device, at least one processor, and at least one output device, a method of identifying pixels corresponding to tissue of an area of noninterest in image data, said method comprising:

by means of at least one input device, receiving pixel data for an image, by means of at least one processor, identifying as cluster centers one or more pixels according to a color density determined for qualifying pixels of image data, the color density determined at least in part based on signal intensity time curves of the pixels of the image data;

by means of at least one processor, growing a cluster unit for the cluster center, by adding to the cluster unit one or more adjacent pixels that are determined to have signal intensity time curves similar to the signal intensity time curve of the cluster center;

by means of at least one processor, merging the cluster unit with an adjacent cluster unit, when a correlation of the signal intensity time curves of the cluster centers satisfies a predetermined correlation threshold;

by means of at least one processor, identifying merged adjacent cluster units, when the merged cluster units exceeds a pre-determined dimension; and by means of at least one output device, outputting image data comprising color density information.

35. The method of claim 34, wherein the image data includes at least magnetic resonance imaging data or computed tomography data or combination thereof.

36. The method of claim 34, further including:

by means of at least one processor, identifying one or more qualifying pixels that satisfy a threshold by at least:

determining a number N of time points at which signal intensity data are obtained for the image data;

setting $t_f$ as a time point at which a peak signal intensity value is expected for tumorous tissue;

by means of at least one processor, calculating, based on N and $t_f$, a madness value for a plurality of pixels using a plurality of time points at which signal intensity is obtained after time point $t_f$; and by means of at least one processor, identifying as qualifying data one or more pixels that satisfy the pre-determined madness threshold.

37. The method of claim 34, wherein the pixel data for an image comprises a pre-contrast signal intensity value $I_0$ and a post-contrast signal intensity value $I_t$ for a plurality of pixels;

further comprising, by means of at least one processor, identifying one or more qualifying pixels that satisfy a threshold by at least:

by means of at least one processor, calculating a signal intensity difference ID between $I_0$ and $I_t$ for each of a plurality of pixels of the image data;

by means of at least one processor, determining a pixel count H of pixels having each signal intensity difference ID;

by means of at least one processor, determining, based on the calculated signal intensity difference for each pixel, a signal intensity difference, $ID_{peak}$, shown by a greatest number of pixels $H_{peak}$;

setting a sub-noise threshold at a signal intensity difference $I_{sub-noise}$, corresponding to a pixel count $N_{SI}$, determined based on $H_{peak}$; and by means of at least one processor, classifying as qualifying data one or more pixels above the sub-noise threshold.

38. The method of claim 34, wherein the pixel data for an image comprises a pre-contrast signal intensity value $I_0$ for a plurality of pixels;

further comprising identifying one or more qualifying pixels that satisfy a threshold by at least:

by means of at least one processor, determining for each pre-contrast signal intensity value $I_0$, a pixel count N of pixels having said pre-contrast signal intensity value, by means of at least one processor, determining a pre-contrast signal intensity value, $I_{peak}$, corresponding to a pixel count of a greatest number of pixels, $N_{peak}$, in the image data;

setting a pre-contrast noise threshold at a signal intensity value, $I_{noise}$, corresponding to a pixel count, $N_I$, determined based on $N_{peak;}$ and by means of at least one processor, classifying as qualifying one or more pixels with pre-contrast signal intensity values above the pre-contrast noise threshold.

39. The method of claim 34, wherein the color density determination includes at least:

by means of at least one processor, for each of a plurality of pixels, determining, as a color density ratio, a ratio of qualifying pixels to total pixels of the image data for a neighborhood of pixels of a pre-specified size; and by means of at least one processor, selecting, as high color density pixels, pixels with a color density ratio above a predetermined percentile of color density ratios of the qualifying pixels.

40. The method of claim 39, wherein the pre-specified size is approximately 1 cm$_3$.

41. The method of claim 39, wherein only pixels with color density exceeding 98% are selected for processing.

42. The method of claim 34, wherein one or more pixels contiguous with a pixel selected as a cluster center are not selected as cluster centers.

43. The method of claim 34, wherein for said growing the cluster unit, signal intensity time curves are judged similar when a correlation coefficient exceeds 0.75, a coefficient of 1.0 being the highest correlation.

44. The method of claim 34, wherein said identifying merged adjacent cluster units includes at least:

generating a large cluster unit by merging adjacent cluster units when the correlation between the signal intensity time curves of sets of adjacent cluster centers or adjacent cluster units satisfies the predetermined correlation threshold; and identifying the large cluster unit only when the large cluster unit exceeds approximately 5 cm in length in any direction.

45. The method of claim 34, wherein said merging adjacent cluster units include at least:

calculating a number of contiguous pixels for the adjacent cluster units, the number being 0 if no pixels of the adjacent cluster units are adjacent; and merging two cluster units of the adjacent cluster units with the highest correlation between their respective cluster centers, when the correlation coefficient of the highest correlation exceeds 0.75, a correlation coefficient of 1.0 being the highest coefficient.

46. The method of claim 34, wherein said tissue of area of non-interest is heart tissue.

47. The method of claim 34, wherein said identifying is performed before implementation of pharmacokinetic analysis.

48. The method of claim 34, wherein said identifying is performed before generation of maximum intensity projection images.

49. The method of claim 1, wherein $N_I$ is closest to $N_{peak}/3$.

50. The method of claim 14, further comprising identifying pixels near a center of mass, CM, whose position calculation comprises at least:

by means of at least one processor, determining an x-coordinate for CM according to a formula:

$$CM_x = \frac{\sum_{v\ above\ P\%} x_v \cdot ColorDens_v}{\sum_{v\ above\ P\%} ColorDens_v}$$

where $CM_x$ is an x-coordinate of CM, P is the pre-determined percentile of color density ratios, $x_v$ is an x-coordinate for pixel v, and $ColorDens_v$ is the color density ratio of pixel v, and determining for CM a y-coordinate, $CM_y$, and a z-coordinate, $CM_z$, according to the formula with a weighted sum of the x-coordinates replaced by a weighted sum of the y-coordinates for calculating $CM_y$, and a weighted sum of the x-coordinates replaced by a weighted sum of the z-coordinates for calculating $CM_z$.

51. The method of claim 14, wherein the pixel data for an image comprises a pre-contrast signal intensity value $I_0$ and a post-contrast signal intensity value $I_t$ for a plurality of pixels; and wherein identifying one or more qualifying pixels that satisfy a threshold further comprises:

by means of at least one processor, determining an enhancement value for each pixel of the image according to the formula $E_t=(I_t-I_0)/I_0$;

by means of at least one processor, comparing $E_t$ for each pixel to a pre-specified enhancement threshold; and by means of at least one processor, classifying the pixel as qualifying data if the pixel satisfies the enhancement threshold.

52. The method of claim 36, wherein the pixel data for an image comprises a pre-contrast signal intensity value $I_0$ and a post-contrast signal intensity value $I_t$ for a plurality of pixels; and wherein identifying one or more qualifying pixels that satisfy a threshold further comprises:

by means of at least one processor, determining an enhancement value for each pixel of the image according to the formula $E_t=(I_t-I_0)/I_0$;

by means of at least one processor, comparing $E_t$ for each pixel to a pre-specified enhancement threshold; and by means of at least one processor, classifying the pixel as qualifying data if the pixel satisfies the enhancement threshold.

53. The method of claim 1, wherein the input data further comprises a post-contrast signal intensity value $I_t$ for a plurality of pixels of the image data; and further comprising:

by means of at least one processor, calculating a signal intensity difference ID between $I_0$ and $I_t$ for each of a plurality of pixels;

by means of at least one processor, determining a pixel count H of pixels having each signal intensity difference ID:

by means of at least one processor, determining, based on the calculated signal intensity difference for each pixel, a signal intensity difference, $ID_{peak}$, shown by a greatest number of pixels $H_{peak}$;

setting a sub-noise threshold at a signal intensity difference $I_{subnoise}$, corresponding to a pixel count $N_{SI}$ determined based on $H_{peak}$;

by means of at least one processor, identifying in the image data one or more pixels with a signal intensity difference below the sub-noise threshold.

54. The method of claim 1, wherein processing data associated with at least some pixels with pre-contrast signal intensity values above the pre-contrast noise threshold comprises carrying out pharmacokinetic analysis using said data.

* * * * *